United States Patent
Meijering et al.

(10) Patent No.: US 9,269,500 B2
(45) Date of Patent: Feb. 23, 2016

(54) HEAT-DISSIPATING DEVICE FOR SUPPLYING POWER TO A HYBRID OR ELECTRIC MOTOR VEHICLE

(75) Inventors: Alexander Meijering, Munich (DE); Micha Dirmeier, Munich (DE); Philipp Petz, Munich (DE); Nicolas Flahaut, Munich (DE); Frank Eckstein, Munich (DE); Bjoern Lath, Munich (DE); Hubertus Goesmann, Nattheim-Auernheim (DE)

(73) Assignee: Bayeriche Motoren Werke Aktiengesellschaft, Munich (DE)

( * ) Notice: Subject to any disclaimer, the term of this patent is extended or adjusted under 35 U.S.C. 154(b) by 1644 days.

(21) Appl. No.: 12/615,630

(22) Filed: Nov. 10, 2009

(65) Prior Publication Data

US 2010/0119921 A1    May 13, 2010

(30) Foreign Application Priority Data

Nov. 12, 2008 (DE) .................. 10 2008 056 859

(51) Int. Cl.
*H01M 10/60* (2014.01)
*H01M 10/653* (2014.01)
(Continued)

(52) U.S. Cl.
CPC ............. *H01G 9/155* (2013.01); *H01G 2/04* (2013.01); *H01G 9/0003* (2013.01); *H01M 2/105* (2013.01); *H01M 10/613* (2015.04); *H01M 10/625* (2015.04); *H01M 10/653* (2015.04); *H01M 10/6554* (2015.04); *H01M 10/6555* (2015.04); *H01M 10/6556* (2015.04); *H01M 10/6557* (2015.04); *H01M 10/6561* (2015.04);

(Continued)

(58) Field of Classification Search
CPC ............ H01M 10/623; H01M 10/653; H01M 10/655–10/6557
See application file for complete search history.

(56) References Cited

U.S. PATENT DOCUMENTS 6,087,038 A * 7/2000 Flament et al. ............... 429/120
6,228,524 B1 * 5/2001 Kohler et al. ................... 429/62
(Continued)

FOREIGN PATENT DOCUMENTS

DE        197 50 069 A1    5/1999
DE        698 23 912 T2    5/2005
(Continued)

OTHER PUBLICATIONS

Machine translation for Tanaka et al., JP 06-223804 A.*
(Continued)

*Primary Examiner* — Edu E Enin-Okut
(74) *Attorney, Agent, or Firm* — Crowell & Moring LLP

(57) ABSTRACT

A power supply device for a hybrid or electric motor vehicle, in particular a passenger vehicle or a motorcycle, includes a plurality of electrochemical storage cells and/or double-layer capacitors. The electrochemical storage cells and/or double-layer capacitors have a casing surface and, in an axial direction, a base surface and a cover surface which are connected by the casing surface, and each include electrodes. Adjacent to the casing surface of at least one of the storage cells and/or double-layer capacitors, a heat-conducting cooling apparatus is disposed which, although electrically insulated from the at least one storage cell and/or double-layer capacitor, is in thermal contact with a first circumferential section of the casing surface and dissipates the heat energy introduced by the casing surfaces of the at least one storage cell and/or the double-layer capacitor.

13 Claims, 1 Drawing Sheet

(51) Int. Cl.
*H01M 10/655* (2014.01)
*H01G 9/00* (2006.01)
*H01G 2/04* (2006.01)
*H01M 2/10* (2006.01)
*H01M 10/625* (2014.01)
*H01M 10/6556* (2014.01)
*H01M 10/6569* (2014.01)
*H01M 10/6557* (2014.01)
*H01M 10/6567* (2014.01)
*H01M 10/6555* (2014.01)
*H01M 10/6554* (2014.01)
*H01M 10/6561* (2014.01)
*H01M 10/613* (2014.01)
*H01M 10/643* (2014.01)

(52) U.S. Cl.
CPC ...... *H01M 10/6567* (2015.04); *H01M 10/6569* (2015.04); *H01M 10/643* (2015.04); *Y02E 60/13* (2013.01)

(56) References Cited

U.S. PATENT DOCUMENTS

| | | | |
|---|---|---|---|
| 8,455,133 | B2 * | 6/2013 | Anantharaman ... H01M 10/625 429/148 |
| 2005/0170241 | A1 | 8/2005 | German et al. |
| 2008/0305388 | A1 * | 12/2008 | Haussman .................... 429/120 |
| 2009/0111009 | A1 * | 4/2009 | Goesmann et al. ........... 429/120 |
| 2010/0119926 | A1 * | 5/2010 | Gaben et al. .................. 429/120 |

FOREIGN PATENT DOCUMENTS

| | | | |
|---|---|---|---|
| DE | 10 2004 005 394 A1 | 8/2005 | |
| DE | 10 2006 059 989 A1 | 6/2008 | |
| DE | 10 2007 010 751 A1 | 8/2008 | |
| JP | 06223804 A * | 8/1994 | .............. H01M 2/20 |
| WO | WO 2008059123 A1 * | 5/2008 | .............. H01M 2/10 |

OTHER PUBLICATIONS

German Search Report dated Sep. 23, 2009 including partial English translation (Nine (9) pages).

* cited by examiner

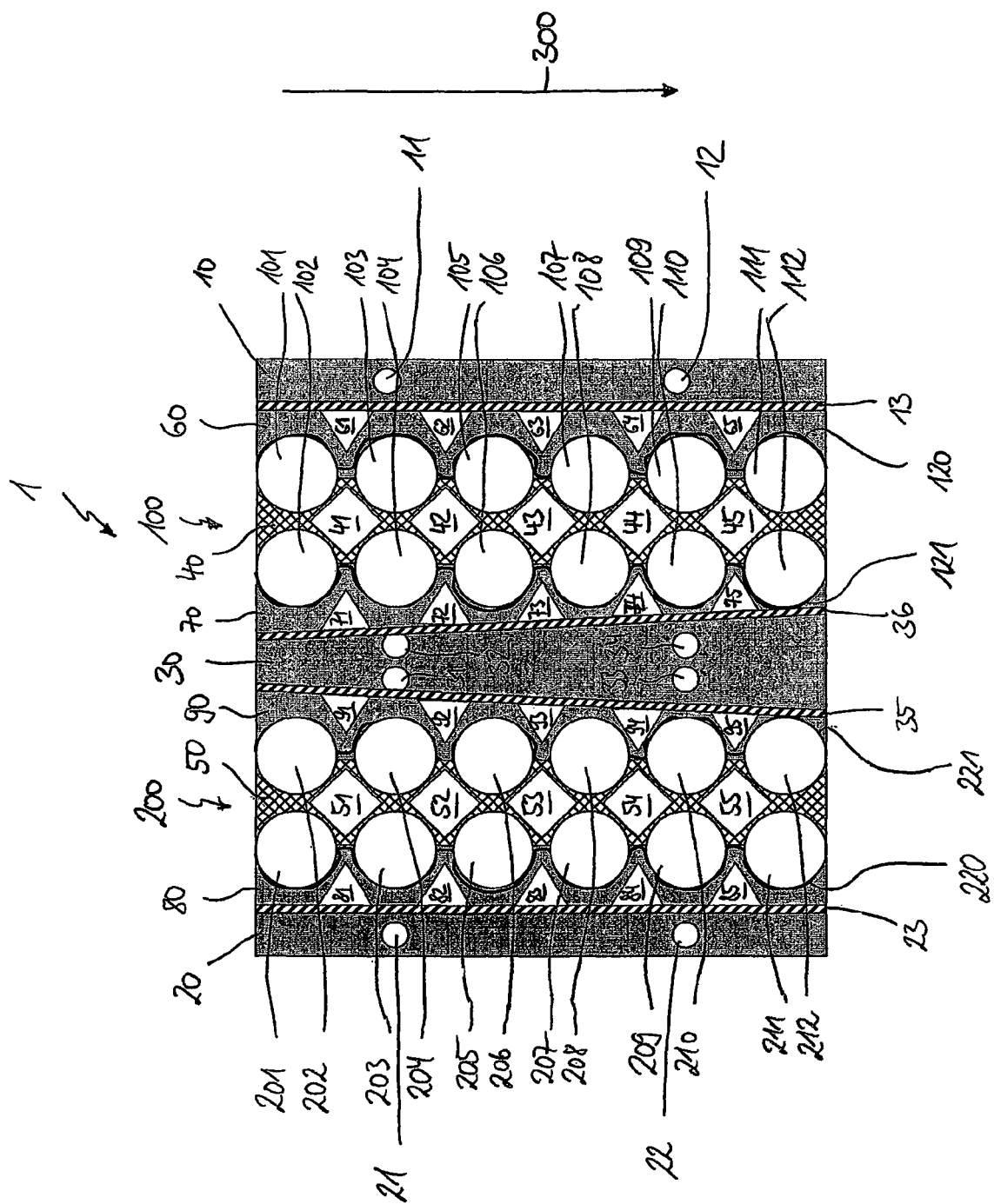

HEAT-DISSIPATING DEVICE FOR SUPPLYING POWER TO A HYBRID OR ELECTRIC MOTOR VEHICLE

CROSS-REFERENCE TO RELATED APPLICATION

This application claims priority under 35 U.S.C. §119 to German Patent Application No. DE 10 2008 056 859.7, filed Nov. 12, 2008, the entire disclosure of which is herein expressly incorporated by reference.

BACKGROUND AND SUMMARY OF THE INVENTION

The invention relates to a device for supplying power to a motor vehicle, in particular a passenger vehicle or a motorcycle, and includes a plurality of electrochemical storage cells and/or double-layer capacitors. The storage cells and/or double-layer capacitors include a casing surface and, in the axial direction, a base surface and a cover surface, which are connected by the casing surface and each include electrodes.

Electrochemical storage cells and/or double-layer capacitors in operation can reach considerable temperatures so that cooling is necessary. The cooling of electrochemical storage cells is done from the outside. If a sufficient cooling cannot be ensured with sufficient certainty, then defects can quickly arise which cannot be reconciled economically with the requirements for service lifetime when used in automobiles.

It is thus the object of the present invention to provide a device for supplying power to a motor vehicle, in particular for the temporary driving of the motor vehicle by an electric motor, in which, through a cooling apparatus, sufficient cooling can be ensured with great certainty.

This object is achieved according to the invention by a device for supplying power to a motor vehicle, in particular a passenger vehicle or a motorcycle. The device includes a plurality of electrochemical storage cells and/or double-layer capacitors, the electrochemical storage cells and/or double-layer capacitors include a casing surface and, in an axial direction, a base surface and a cover surface, which base and cover surfaces are connected by the casing surface and each include electrodes. Adjacent to the casing surface of at least one of the storage cells and/or double-layer capacitors, a heat-conducting cooling apparatus is disposed which, although electrically insulated from the at least one storage cell and/or the double-layer capacitor, is in thermal contact with a first circumferential section of the casing surfaces and dissipates heat energy introduced by the casing surfaces of the at least one storage cell and/or the double-layer capacitor. Advantageous further developments are described herein.

In an advantageous manner the heat can thus be dissipated in the radial direction of the storage cell and/or the double-layer capacitor immediately at its point of origin when used in an automobile. The complexity of the construction is relatively low. Moreover, the device according to the invention is distinguished by a high service lifetime. The cooling apparatus's radial arrangement, in particular due to its large attachable surface, enables good thermal attachment of the storage cell and/or the double-layer capacitor to the cooling apparatus. Moreover, a simple, modular design is made possible in which many identical parts can be used.

The electrochemical storage cells are preferably lithium-based battery cells or nickel-metal hybrid batteries, which are distinguished by a high storage capacity with low volume. The storage cells and/or double-layer capacitors each include a circular, prismatic, rectangular, square, oval, or obovate cross section. In accordance with requirements, modules consisting of several storage cells and/or the double-layer capacitors can thus be formed which have a high packing density.

In a development of the invention, it is provided that between each of the two storage cells and/or the double-layer capacitors a carrier made of electrically insulating material, in particular PP, is disposed in such a manner that it abuts a second circumferential section of the casing surface of each of the two storage cells and/or the double-layer capacitors. The carrier can optionally be formed of a heat-conducting material, for example, filled silicone. Expediently a respective storage cell and/or a respective double-layer capacitor is in contact along its entire circumference either with the cooling apparatus or with the carrier. Due to this there is, along with good cooling, the advantage of a mechanically loadable seating of the storage cells and/or the double-layer capacitors. If the elasticity of the carrier can be adjusted, then there is furthermore a compensation of tolerance by the carrier.

In a further development, the cooling apparatus includes a heat-conducting half shell which has a surface shape complementary to the casing surface of the at least one storage cell and/or the double-layer capacitor and is in thermal contact with the at least one storage cell and/or the double-layer capacitor. Due to the heat-conducting half shell's surface shape complementary to the storage cell and/or the double-layer capacitor, outstanding cooling is possible. At the same time, the storage cells and/or the double-layer capacitors are fixed in addition by the shape of the half shells.

In particular, the heat-conducting half shell extends (in the axial direction) over a length of the casing surface, specifically a length which corresponds at least to the length of an active part of the storage cell and/or the double-layer capacitor. The active part of a storage cell is also called a "winding" or a "jelly roll." Thereby, the reliability of the cooling is greatly increased.

According to a further development, the heat-conducting half shell is thermally coupled (in the radial direction) over a circumferential arc of preferably 150° to 180° with a respective casing surface. According to this development, an outstanding fixation of the storage cell and/or the double-layer capacitor with maximum heat dissipation is ensured.

In a further form of embodiment of the invention, it is provided that the heat-conducting half shell is thermally connected to a cooling wall of the cooling apparatus, where the heat-conducting half shell is disposed between the cooling wall and the at least one storage cell and/or the double-layer capacitor. The cooling apparatus of the device according to the invention is thus formed in two parts. In immediate thermal contact with the storage cells and/or the double-layer capacitors to be cooled are the half shells, which in turn dissipate the heat at a cooling wall. The two-part configuration of the cooling apparatus enables a constructively simple, in particular modular, design according to which the half shells can be adapted, with thermal optimization, to the shape of the storage cells and/or double-layer capacitors. Also, the transfer of heat to the cooling wall can be done with optimization, and in particular for a large number of storage cells and/or double-layer capacitors, in a simple manner.

The cooling wall can, in particular, include cooling ducts through which or around which there flows a heat-dissipating medium, in particular a coolant such as R 134a, carbon dioxide R 744, water, or air. Thereby, the dissipation of heat can always be ensured in a reliable and sufficient manner even with short-term peak loads of the storage cell. The cooling ducts can, for example, be integrated into a circuit of an air conditioning system of the motor vehicle.

The cooling wall can furthermore be enclosed by thermal insulation. For example, the cooling wall is provided with a preferably electrically operated air conditioning device which dissipates the heat energy and which preferably works according to the vaporizer process or Peltier process. Thereby, the device can be cooled reliably with little effort and substantially unaffected by the ambient temperature at the actual location at which the device according to the invention is disposed in the vehicle.

Expediently, the heat-conducting half shell and/or the cooling wall can be formed from aluminum, copper, a filled silicone, or another material which conducts heat well.

In another expedient development, it is provided that, between the heat-conducting half shell and the casing surfaces of the at least one storage cell and/or the double-layer capacitor, an insulating layer is disposed. The insulating layer serves to ensure electrical insulation of the half shell consisting of electrically conducting material with respect to the casing surfaces of the storage cell(s) and/or double-layer capacitor(s). The insulating layer can, for example, be formed from filled silicone, an epoxy resin, or another plastic, such as polyurethane, polyimide, or polyacrylate. The material strength of the insulating layer depends on tolerances of the storage cell and the voltage level of the device. Expediently, the layer thickness will be between 01. mm and 1 mm. The thermal conductivity is typically $\lambda=0.5$ to 5 W/(K m).

According to a further advantageous development, between the heat-conducting half shell and the cooling wall a heat-conducting paste, a heat-conducting foil, or a heat-conducting coating is provided. This provides for a defined heat transfer. Moreover, it is possible to prevent, at the transition surface, air pockets which can lead to local overheating and thus possibly to a defect in the device. The heat-conducting paste, the heat-conducting foil, or the heat-conducting coating is preferably electrically insulating and, in addition, compensates manufacturing tolerances for the clearance or fills clearances up. Thereby, good thermal contact is achieved even with the customary manufacturing tolerances and in case of vibrations. A heat-conducting foil includes preferably silicone with wax and/or ceramics as a filler or a mixture of various heat-conducting substrates and can include multi-layer coatings.

In an extension of the invention, it is provided that the carrier is provided with one or more cavities in areas which cannot assume a holding function. The one or more cavities can serve for active cooling with a coolant medium conducted through there or for passive cooling by heat convection. Furthermore, a reduction in weight is achieved.

It is furthermore provided that the heat-conducting half shell for forming defined surfaces for transferring heat to the cooling wall includes one or more cavities in the area of each of the two storage cells and/or double-layer capacitors disposed one over the other. Along with a reduction in weight, the cavities serve essentially to optimize the heat-conducting half shell's surfaces for heat transfer to the cooling wall such that a predefined force to which the arrangement must be exposed in order to ensure a certain contact pressure and in order to ensure the required cooling is not exceeded. The smaller the heat transfer surface is chosen, the lower it is possible to set the force with which the cooling wall must be pressed against the half shell. The size of the heat transfer surfaces, and thus the size of the cavities, are thus to be chosen as a function of the force to be applied. Expediently, the heat transfer surface is formed to be as small as possible so that the necessary force can be kept small.

It is furthermore provided that the plurality of storage cells in a module are connected in series and/or in parallel, where one module is formed of storage cells and/or double-layer capacitors disposed in vertical stacks of adjacent pairs, where a common carrier and at least one common heat-conducting half shell is provided for the storage cells and/or double-layer capacitors disposed in a vertical stack in groups of two.

According to a further development there is, between the cooling wall and the heat-conducting half shell, a plane in which the transfer of heat occurs and which is disposed obliquely in relation to the direction of gravity so that the module, in particular the heat-conducting half shell, is pressed by the force of gravity onto the cooling wall. By applying a defined force in the direction of gravity, the necessary force between the half shell and the cooling wall can be set. Should it be necessary in addition, a device can be provided which amplifies the force prevailing between the half shell and the cooling wall in the direction of the force.

In an extension of the invention, it is provided that at least one of the electrodes disposed in each of the storage cells and/or double-layer capacitors (in the so-called winding) consists of metal and is provided to a large extent over its entire surface with a metal layer. The metal electrode or the metal layer, in particular a metal foil, is connected in an electrically conducting manner via a connecting element to a terminal provided outside of the storage cell or outside of the double-layer capacitor. Along with this it is provided for further improvement of the cooling that a heat-conducting cooling plate, which is in thermal contact with a plurality of the terminals of the storage cells or the double-layer capacitors, dissipates the heat energy introduced by the metal electrodes or the metal layers of the electrodes to the terminal via the connecting element. According to this development, the radial cooling of the storage cells and/or the double-layer capacitors is supported by axial cooling.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE is a simplified, schematic, cross-sectional view (not to scale) through a device according to an exemplary embodiment of the invention for supplying power.

DETAILED DESCRIPTION OF THE DRAWING

The schematically represented device 1 for supplying power to a motor vehicle includes, by way of example, two modules 100, 200. The storage cell module 100 includes storage cells 101 to 112, which in the exemplary embodiment are disposed in two vertical stacks, with six cells to a stack.

Analogously to this, the storage cell module 200 includes storage cells 201 to 212 which, in the exemplary embodiment, are disposed in two vertical stacks, also with six cells to a stack. Each of the known storage cells 101 to 112 and 201 to 212 includes at least one electrode made of metal (not shown) which is disposed in the storage cell. This electrode can be provided with a metallic layer to a large extent over its entire surface (which also cannot be seen from the FIGURE). In a known manner, the cells interior connecting element (also not shown) is connected in an electrically conducting manner to a terminal provided outside of the storage cell in question on its front side or is connected in an electrically conducting manner to a terminal provided outside of the storage cell in question on its back side. The terminal can be a contact face in the form of a base, as in a battery terminal, which is contacted by a contact spring. Via the terminals, the respective storage cells of a module 100 or 200 are connected in series and/or in parallel so that at connecting posts (which are not represented) a total voltage of the respective module can be tapped.

Between the two storage cell rows of a module 100, 200, a respective carrier 40, 50 made of electrically insulating material is disposed. The carrier can, in particular, be formed from plastic, for example, polypropylene PP. The plastic material offers elasticity in the horizontal direction, that is, in a plane perpendicular to the plane of the drawing. The carrier 40, 50 has in the radial direction a surface shape complementary to the casing surfaces of the storage cells and abuts a respective circumferential section of the casing surface of each storage cell of the two storage cell rows. In so doing, the arc over which the carrier abuts the respective casing surface of the storage cell is preferably between 150° and 180°. As can be seen clearly in the FIGURE, the carrier 40, 50 extends approximately over the entire length of a storage cell row's six storage cells which are disposed in a vertical stack. In areas in which no holding function is assumed by the carrier 40, 50, it is provided with cavities 41 to 45 and 51 to 55. The cavities having, for example, a square cross section, can be optimized to achieve a maximum savings of material in order to keep the weight of the device low. On the other hand, the cavities can also be used to conduct a cooling medium through them in order to dissipate heat from the storage cells.

The heat arising in the storage cells 101 to 112; 201 to 212 is dissipated via a heat-conducting cooling apparatus, which is disposed so as to be adjacent to the respective casing surfaces of the storage cells 101 to 112; 201 to 212. The cooling apparatus is designed with a dipartite structure and includes heat-conducting half shells 60, 70, 80, 90, which have in the radial direction a surface shape complementary to the casing surfaces and which are in thermal contact with respective casing surfaces of the storage cells 101 to 112; 202 to 212. As the second part, the cooling apparatus includes cooling walls 10, 20, 30, which are thermally connected to the heat-dissipating half shells 60, 70, 80, 90. Along with this, a respective heat-conducting half shell is disposed between a cooling wall and a row of storage cells. The heat-conducting half shells can be formed from aluminum, copper, or another material which conducts heat well, in particular a metal. The material of the cooling walls 10, 20, 30 can be selected in an analogous manner.

A respective heat-conducting half shell 60, 70, 80, 90, due to its surface shape complementary to the storage cells of the storage cell row, is in thermal contact with a respective circumferential section of the casing surface of a respective storage cell so that the heat energy introduced by the casing surfaces of the storage cells can be dissipated from the storage cells in the radial direction.

Each one of the heat-conducting half shells 60, 70, 80, 90 extends in the axial direction (that is, out from the plane of the page) over a length of the casing surface, specifically a length which corresponds at least to the length of an active part of the storage cell 101 to 112; 201 to 212. The active part of a storage cell is also called a winding or a jelly roll. Preferably, the length of a respective heat-conducting half shell corresponds to the length of the storage cells in order to ensure optimal heat dissipation and mechanically stable seating. A respective heat-conducting half shell is thermally coupled over a circumferential arc of at most 180°, preferably 150° and 180°, with a respective casing surface of a storage cell. Preferably, a respective storage cell is enclosed over its entire 360° circumferential face by the carrier and the heat-conducting half shell.

Between the casing of a respective storage cell 101 to 112; 201 to 212 and the respective heat-conducting half shell 60, 70, 80, 90, a thermally conducting but electrically insulating layer 120, 121, 220, 221 is disposed. Through the electrical insulation it is possible to embody the casing surfaces of the storage cells to be electrically conducting and to supply them with a voltage. The heat-conducting insulation layer can be formed of one or more foils disposed in a vertical stack. As material, for example, filled silicone, epoxy resin or another plastic such as polyurethane, polyimide, polyacrylate, or PTFE of slight thickness can be used. Preferably, one or more foils are used. With the use of two or more heat-conducting foils disposed in a vertical stack it can be ruled out with great certainty that a locally limited material defect in any of the heat-conducting foils lies precisely over the other material defect. Thereby, electrical short-circuits due to material defects, which are never to be ruled out, can be effectively prevented.

Between a respective heat-conducting half shell 60, 70, 80, 90 and a respective adjacent cooling wall 10, 20, 30 a heat-conducting paste, a heat-conducting foil, or a heat-conducting coating is disposed as an option. This serves to prevent air pockets between the heat-conducting half shell and the cooling wall since, due to such air pockets, local temperature spikes could occur. Through the heat-conducting paste, the heat-conducting foil, or the heat-conducting coating tolerance compensation is provided, which reduces the danger of air pockets between a respective heat-conducting half shell 60, 70, 80, 90 and the adjacent cooling wall 10, 20, 30. Moreover, the contact pressure which is present between the heat-conducting half shells and the cooling wall, and which is necessary for the production of a contact which conducts heat well and for the prevention of air pockets, can be set to be less than in an arrangement in which the heat-conducting paste, the heat-conducting foil, or the heat-conducting coating is omitted.

In this connection, for shaping defined surfaces of a respective half shell 60, 70, 80, 90 for conducting heat to an adjacent cooling wall 10, 20, 30, it is expedient if one or more cavities 61 to 65, 71 to 75, 81 to 85, 91 to 95 are provided in the area of each of the two storage cells 101 to 112; 201 to 212 stacked one over the other. Thereby, along with a savings in material, the surface for transferring heat to a respective cooling wall is reduced, whereby the necessary contact pressure can be reduced and, at the same time, the probability of air pockets is reduced.

Each of the cooling walls 10, 20, 30 includes cooling ducts 11, 12, 21, 22, 31, 32, 33, 34 through which or around which there flows a heat-dissipating medium, in particular a coolant, such as R 134a, carbon dioxide R 744, water, or air. Thereby the heat dissipation can always be ensured in a reliable and sufficient manner even with short-term peak loads of the storage cell. The cooling ducts can be formed as a tube or so-called multiport tube and glued or soldered onto a plate. The cooling walls can in given cases be enclosed, in addition or alternatively, by thermal insulation. In connection with this, the cooling walls can be provided with an electrically or mechanically operated air conditioning device which dissipates the heat energy and which preferably works according to the vaporizer process or Peltier process. The cooling ducts can, for example, be integrated into a circuit of an air conditioning system of the motor vehicle.

In order to obtain a good mechanical, and thus thermal, contact between the heat-conducting half shells 60, 70, 80, 90 and the cooling walls 10, 20, 30, at least one plane, which is formed between a cooling wall 10, 20, and the associated heat-conducting half shell 60, 70, 80, 90 and in which the heat transfer occurs, is disposed obliquely in relation to the direction of gravity 300 so that the module 100, 200 is pressed by the force of gravity onto the respective cooling wall 10, 20, 30. In the embodiment example represented in the drawing, the planes formed between the cooling wall 30 and the heat-conducting half shells 70, 90 are disposed obliquely in relation to the direction of gravity 300. The planes formed between the cooling walls 10, and the heat-conducting half shells 60 or 80 on the contrary lie parallel to the direction of gravity 300. In a development variant, these planes could also have the described form of a wedge. Through the obliqueness of the planes and the gravitational force of the modules 100, 200, possibly amplified by a cover on the upper side of the device (but not represented in the FIGURE), the modules 100, 200 can be pressed onto the cooling walls 10, 20, 30, whereby lateral forces on the module 100, 200 with the storage cells 101 to 112, 201 to 212 result. Thereby, the previously mentioned contact pressure on the surfaces transferring heat from the heat-conducting half shells 60, 70, 80, 90 to the respective cooling walls 10, 20, 30 is produced.

The housing cover (not shown) expediently includes electrical connectors, which connect the modules 100, 200 in series and/or in parallel when the housing cover is placed on the modules and which eliminates the series circuit if the housing cover is removed.

According to the exemplary embodiment described in the FIGURE, the storage cells 101 to 112; 201 to 212 are cooled in the radial direction over about half of the casing surface of the storage cells. The heat flow in this case has the following path: electrochemically active part (winding or jelly roll)-cell jacket (casing surface)-electrically insulating heat-conducting foil-thermally conducting half shell-heat-conducting past-cooling wall. Cooling over the electrodes in the axial direction is thus unnecessary but can also be provided in addition.

Thus, it can be provided for further improvement of the cooling, for example, that a heat-conducting plate, which is in thermal contact with a plurality of terminals of the storage cells or the double-layer capacitors dissipates heat energy introduced by the metal electrodes or the metal layers of the electrodes (in the winding, also called the jelly roll) to the terminal via the connecting element. According to this development the radial cooling of the storage cells and/or double-layer capacitors is supported by axial cooling.

Between the cooling plate and the terminals, for example, an electrically insulating, heat-conducting layer can be provided in order to improve the cooling without there being any danger of short circuits. The heat-conducting layer can be formed from one or more heat-conducting foils disposed in a vertical stack, in particular from polyimide or PTFE of slight thickness. With the use of two or more heat-conducting foils disposed in a vertical stack, it can be ruled out with great certainty that even a locally limited material defect in any of the heat-conducting foils lies precisely over the other material defect. Thereby electrical short-circuits due to material defects, which are never to be ruled out, can be effectively prevented. Along with this the heat-conducting foil can be fixed with its first side on the terminals, preferably by gluing. The second layer can include a lubricating coating, in particular a PVDF or PTFE coating. Thereby on one side the position of the heat-conducting foil is fixed and on the other side the heat-conducting foil can slide by on the thermal contact surface to the cooling plate so that even in case of vibrations or relative movements between the storage cell or the double-layer capacitor and the cooling plate, no damage to the heat-conducting foil occurs. In particular, the heat-conducting foil provided between the terminals of the storage cells and the cooling plate can be formed to be plastically or elastically deformable under pressure. The heat-conducting foil is preferably electrically insulating and compensates manufacturing tolerances of the clearance or fills up the clearance.

TABLE OF REFERENCE NUMBERS

1 Device for supplying power to a motor vehicle
10 Cooling wall
11 Cooling duct
12 Cooling duct
13 Heat-conducting paste
20 Cooling wall
21 Cooling duct
22 Cooling duct
23 Heat-conducting paste
30 Cooling wall
31-34 Cooling ducts
35 Heat-conducting paste
36 Heat-conducting paste
40 Carrier
41-45 Cavities
50 Carrier
51-55 Cavities
60 Heat-conducting half shell
61-65 Cavities
70 Heat-conducting half shell
80 Heat-conducting half shell
81-85 Cavities
90 Heat-conducting half shell
91-95 Cavities
100 Module
101-112 Storage cells/double-layer capacitors
120 Insulating layer
121 Insulating layer
200 Module
201-212 Storage cells/double-layer capacitors
220 Insulating layer
221 Insulating layer
300 Direction of the force of gravity The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A power supply device for a motor vehicle, comprising:
a plurality of at least one of electrochemical storage cells and double-layer capacitors, each having a casing surface and, in an axial direction, a base surface and a cover surface, the base and cover surfaces being coupled by the casing surface, and each including electrodes; and
a heat-conducting cooling apparatus disposed adjacent to the casing surface of at least one of the storage cells and double-layer capacitors, the heat-conducting cooling apparatus being electrically insulated from the at least one storage cell or double-layer capacitor and being in thermal contact with a first circumferential section of the casing surface of the at least one storage cell or double-layer capacitor, whereby heat energy introduced by the casing surface of the at least one storage cell or double-layer capacitor is dissipated by the heat-conducting cooling apparatus, wherein the heat-conducting cooling apparatus comprises a heat-conducting half shell that is thermally coupled to a substantially planar cooling wall of the cooling apparatus, the heat-conducting half shell being disposed between the cooling wall and the at least one storage cell or double-layer capacitor, and wherein at least one cooling duct is disposed within the cooling wall and configured such that a heat-dissipating medium flows through or around said ducts, and wherein, between the cooling wall and the heat-conducting half shell, a heat transfer plane is disposed obliquely in relation to a direction of gravity such that the heat-conducting half shell is pressed onto the cooling wall via gravitational force.

2. The power supply device according to claim 1, further comprising:

an electrically insulating material carrier disposed between each of two of the storage cells or double-layer capacitors, the carrier abutting a second circumferential section of the casing surface of each of the two storage cells or double-layer capacitors.

3. The power supply device according to claim 1, wherein the heat-conducting cooling apparatus comprises a heat-conducting half shell having a surface shape complementary to the respective casing surface of the at least one storage cell or double-layer capacitor, the heat-conducting half shell being in thermal contact with the at least one storage cell or double-layer capacitor.

4. The power supply device according to claim 3, wherein the heat-conducting half shell extends over a length of the casing surface which corresponds at least to a length of an active portion of the storage cell or double-layer capacitor.

5. The power supply device according to claim 1, wherein the heat-dissipating medium is one of R 134a, carbon dioxide R 744, water, and air.

6. The power supply device according to claim 1, wherein at least one of the heat-conducting half shell and the cooling wall is formed from one of aluminum, copper, and a filled silicone.

7. The power supply device according to claim 3, further comprising an insulating layer disposed between the heat-conducting half shell and the casing surface of the at least one storage cell or double-layer capacitor.

8. The power supply device according to claim 1, further comprising one of a heat-conducting paste, a heat-conducting foil, and a heat-conducting coating disposed between the heat-conducting half shell and the cooling wall.

9. The power supply device according to claim 2, wherein one or more cavities are arranged in areas of the carrier that are not configured to hold the two storage cells or double-layer capacitors.

10. The power supply device according to claim 1, wherein the heat-conducting half shell forms defined surfaces for transferring heat to the cooling wall, one or more cavities being arranged in an area along the cooling wall and between each two storage cells or double-layer capacitors stacked one over the other.

11. The power supply device according to claim 3, wherein a module includes a plurality of the storage cells or double-layer capacitors coupled in one of a serial and parallel configuration, one module being formed of the plurality of storage cells or double-layer capacitors that are disposed in vertical stacks of adjacent pairs, a common carrier and at least one common heat-conducting half shell being provided for the storage cells or double-layer capacitors of the one module.

12. The power supply device according to claim 1, wherein at least one of the electrodes disposed in each of the storage cells or double-layer capacitors includes metal, the metal being connectable in an electrically conducting manner via a connecting element to a terminal arranged outside of the storage cell or double-layer capacitor, a heat-conducting cooling plate in thermal contact with a plurality of the terminals dissipating heat energy introduced by the metal to the terminal via the connecting element.

13. The power supply device according to claim 12, wherein metal is a metal foil.

* * * * *